2,718,468

OLEAGINOUS SPREAD

Edwin P. Jones, Herbert J. Dutton, and John C. Cowan, Peoria, Ill., assignors to the United States of America as represented by the Secretary of Agriculture No Drawing. Application April 22, 1952,
Serial No. 283,745

4 Claims. (Cl. 99—123)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to novel oleaginous compositions possessing physical properties and constituent ingredients which render them suitable as a spread for bread, and having applications analogous to butter, margarine or other spreads. It relates more particularly to spreads having the essential physical and nutritional properties of butter, margarine or other spreads possessing the property of spreadability over a wide range of temperatures.

Butter, margarine, and similar oleaginous spreads suffer from a disadvantage of loss of spreadability at low temperatures. For example, the temperatures within the range of freezing and below, prior oleaginous spreads have tended to set up as hard intractable masses which can not be spread. Moreover, many specialty spreads designed for use at low temperatures heretofore, suffer from the disadvantage of loss of solid consistency at room temperatures.

We have discovered a composition which may consist principally of a liquid edible glyceride oil such as soybean oil, peanut oil, sunflower seed oil, safflower oil, cottonseed oil, lard oil, oleo oil, and the like, and which contains minor proportions of ingredients which impart in the composition desirable characteristics of spreadability at temperatures ranging from that experienced in warm tropical climates or desert regions to those temperatures encountered in the winter season in temperate or even polar climates.

Our composition consists in general of about 80 to 90 percent vegetable oil and, as an additive glyceride material approximately 10 to 20 percent of the mono- or diglycerides of fat acids particularily those acids which normally occur in such oils, or mixtures of such mono- or diglycerides. Our composition also contains a minor proportion of polyalkylene glycol esters of fat acids. The amount of the latter ingredient may vary from 0.5 percent to 2.0 percent, based on the total composition. The polyalkylene glycol esters of fat acids are preferably the polyethylene glycol mono-, di- or tri-esters of fat acids such as stearic, palmitic, lauric, oleic and the like, or mixtures of such esters. We may use the esters of polyethylene glycols having molecular weights of approximately 200 to approximately 600, i. e., those containing four to twelve glycol residues.

When either mono- or diglycerides are mixed with vegetable oils in the proportions mentioned in the foregoing paragraphs, the usual procedure is to dissolve the former in the latter at relatively elevated temperatures, for example around 60–70° C. At these temperatures complete solution takes place. However, upon cooling, crystals of the dissolved glycerides form, and the composition has a definite grainy texture at room temperatures or below. This renders the composition undesirable or unsuitable for use as a spread. We have discovered that this undesirable tendency may be minimized by rapidly chilling the warm solution. Rapid chilling induces the formation of large numbers of very small crystals which are organoleptically impalpable instead of the larger grainy crystals.

The compositions prepared by solution in the oil and subsequent rapid chilling are improved, according to the present invention, by the addition of minor proportions of the fat acid polyalkylene glycol esters. These ingredients appear to accentuate the effect of rapid chilling upon crystal growth and also to impart improved properties of plasticity and spreadability to the compositions.

The compositions of this invention may also contain the various flavoring and coloring constituents that are familiar in the art of the manufacture of oleaginous spreads. For example, a butter flavor may be imparted by including the desired amount of butter starter. Salt may be added in the proportion required for satisfactory taste. Other flavoring or essential ingredients such as Vitamin A may also be added as desired.

Our compositions may include a wide variety of flavor and food ingredients. For example, it may include the various fruit essences, alone or in admixture with the ingredients previously mentioned. Ground fruit may also be added, particularily ground fruit or fruit pulps that have been dehydrated or have had their water content reduced. Likewise ground or comminuted nuts and the like may be added. If desired, various substituting ingredients may be added. For example, sugar, dextrose, syrups, honey and the like may be incorporated.

A characteristic of the products of the present invention which renders them peculiarly valuable as universal spreads in their apparent thixolability. The product may be molded in any desirable cake or print form, retaining this form over a wide range of temperature, the material being stiffly plastic. However, if mildly worked with a spatula, as one does in spreading the material on bread, its stiffness diminishes, and it becomes readily spreadable. Our products exhibit this property even at low extremes of temperature.

The following specific example illustrates the invention.

EXAMPLE

Refined soybean oil, 1145 grams, commercial glycerol monosterate (containing glycerol disterate), 203 grams, and 15 grams of polyethylene glycol monosterate containing approximately seven glycol residues were warmed to 65° C. to form a slightly cloudy, slightly viscous solution to which was added the desired amount of vegetable coloring and butter flavoring dissolved in 105 grams of refined soybean oil. The liquid was then rapidly chilled in metal trays in the freezing compartment of a refrigerator to form a plastic butter-like spread. It was transferred to a kitchen cake mixer and 23 grams of powdered table salt was gradually added for uniform incorporation. The spread became more plastic due to the mechanical action of the mixer but when transferred to another container assumed its former firmness or consistency.

Pentrometer measurements were conducted ["ASTM Standards," part 5, page 816 (1949)] on the above product, a commercial creamery butter and a commercial margarine at 73° F., 34° F. and 0° F. after a suitable tempering time. The data shown in Table I were obtained with a special grease cone weighing 145 grams.

Table I

| Product | Penetration in 0.1 mm. at— | | |
|---|---|---|---|
| | 73° F. | 34° F. | 0° F. |
| Butter | 189 | 20 | 3 |
| Margarine | 166 | 32 | 4 |
| Spread of example | 150 | 101 | 50 |

Actual spreading tests using bread indicated that neither butter nor margarine were spreading at 34° F. whereas the spread of Example I was readily spreadable even at 0° F. Independent tests indicate that a pentrometer measurement of 40 carried out in accordance with the above procedure is required for suitable bread spreadability. Our results have further indicated that these pentrometer measurements provide a reliable indication of the actual spreadability.

As previously indicated, the procedure of the foregoing example may be varied by varying the vegetable oil and mono- or diglycerides content and by varying the amount of polyalkylene glycol esters. When these ingredients are maintained within the ranges heretofore specified, and a procedure of compounding includes a rapid cooling of the oleaginous solution, spreads are produced which possess characteristics of spreadability varying in degree from that of the spread of the example. The incorporation of flavoring, seasoning, vitamin, and other ingredients may be accomplished before the cooling step or at any time thereafter as illustrated by the addition of salt in the foregoing example. The texture of our novel product as well as its gross appearance may be altered by the incorporation of air by beating or whipping. Such treatment increases the opacity and tends to brighten the color.

In place of the refined soybean oil of the example we may substitute other liquid edible glyceride oils, preferably refined and deodorized such as peanut oil, sunflower seed oil, safflower oil, cottonseed oil, lard oil, and the like. The oils may be used alone or in admixture with each other.

We claim:

1. The method comprising dissolving in an edible glyceride oil an additive glyceride material of the group consisting of the mono- and diglycerides of a fat acid and mixtures of said glycerides, at a temperature at which said additive glyceride material is soluble in said oil, the amount of additive glyceride material being within the range of 10–20 percent based on a combined weight of oil and additive glyceride material, and chilling the composition rapidly so as to induce the formation of microcrystals of the additive glyceride material in the oil.

2. The method of claim 1 in which 0.5–2.0 percent by weight of a polyalkylene glycol ester of a fat acid is added before the chilling step.

3. A thixolabile oleaginous composition of matter comprising approximately 80–90 parts by weight of an edible glyceride oil, 10–20 parts by weight of an additive glyceride material of the group consisting of the mono- and diglycerides of a fat acid and mixtures of said glycerides, and 0.5–2.0 parts by weight of a polyalkylene glycol ester of a fat acid, said additive glyceride material being in the form of microcrystals.

4. An oleaginous spread composition comprising 80–90 parts by weight of refined soybean oil, 10–20 parts by weight of a mixture consisting of a major proportion of a monoglyceride of a fat acid and a minor proportion of a diglyceride of a fat acid, and 0.5–2.0 parts by weight of a polyoxyalkylene monostearate, said composition possessing bread spreadability at temperatures substantially below normal room temperature.

References Cited in the file of this patent

UNITED STATES PATENTS

| Re. 19,425 | Harris | Jan. 15, 1935 |
| 1,507,426 | Reynolds | Sept. 2, 1924 |
| 2,132,393 | Coith et al. | Oct. 11, 1938 |
| 2,232,401 | Newton et al. | Feb. 18, 1941 |

OTHER REFERENCES

Serial No. 184,967, Schou (A. P. C.), published June 15, 1943.